(12) United States Patent
Lin (10) Patent No.: US 11,482,806 B1
(45) Date of Patent: Oct. 25, 2022

(54) BATTERY CONNECTION DEVICE

(71) Applicant: Cheng Uei Precision Industry Co., LTD., New Taipei (TW)

(72) Inventor: Hong Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/473,996

(22) Filed: Sep. 13, 2021

(30) Foreign Application Priority Data

Jul. 15, 2021 (CN) .......................... 202121614417.9

(51) Int. Cl.
    *H01R 13/52*      (2006.01)
    *H01R 11/28*      (2006.01)
    *H01M 50/543*     (2021.01)

(52) U.S. Cl.
    CPC ...... *H01R 13/5202* (2013.01); *H01M 50/543* (2021.01); *H01R 11/282* (2013.01); *H01R 13/5216* (2013.01)

(58) Field of Classification Search
    CPC ............ H01R 13/5202; H01R 13/5216; H01R 11/82; H01M 50/543
    See application file for complete search history.

(56) References Cited

U.S. PATENT DOCUMENTS

| | | | |
|---|---|---|---|
| 8,734,191 B2 * | 5/2014 | Zhao | H01R 13/6456 439/701 |
| 10,431,944 B1 * | 10/2019 | Su | H01R 24/86 |
| 10,468,812 B1 | 11/2019 | Lee et al. | |

* cited by examiner

*Primary Examiner* — Briggitte R. Hammond
(74) *Attorney, Agent, or Firm* — Cheng-Ju Chiang (57) ABSTRACT

A battery connection device includes a base end connector, a battery end connector and a waterproof rubber ring. The base end connector includes a base end terminal module. The base end terminal module is mounted to the base end connector. The base end connector has a ring-shaped holding groove. The holding groove surrounds the base end terminal module. The battery end connector is docked with the base end connector. The battery end connector includes a base plate, and a battery end terminal module mounted on the base plate. The base end terminal module is docked with the battery end terminal module. The waterproof rubber ring is mounted between the base end connector and the battery end connector.

13 Claims, 6 Drawing Sheets

BATTERY CONNECTION DEVICE

CROSS-REFERENCE TO RELATED APPLICATION

The present application is based on, and claims priority from, China Patent Application No. 202121614417.9, filed Jul. 15, 2021, the disclosure of which is hereby incorporated by reference herein in its entirety.

BACKGROUND OF THE INVENTION

1. Field of the Invention

The present invention generally relates to a battery connection device, and more particularly to a battery connection device which is easily inserted to or withdrawn from, and the battery connection device maintaining a better waterproof performance under a high frequency insertion and a high frequency withdrawal.

2. The Related Art

Generally, when an electric vehicle is charged, a user need wait for a long time, in order to decrease waiting time of the user, some electric vehicles are powered through on-board batteries on account of changing conveniences of the on-board batteries. A battery connection device is directly connected between the on-board battery and the electric vehicle, and the battery connection device must have a better waterproof performance, so that the battery or the electric vehicle is prevented from being damaged. Whereas, the on-board battery usually must be changed, hence, a step of inserting and withdrawing the on-board battery must be simple for avoiding that too much time is spent in changing the on-board battery.

Existing waterproof structures are generally a glue dispensing type, an adhesive-backed type, a sealed enclosure type and an O-ring rubber gasket type, etc. Most of the existing waterproof structures are inapplicable to the battery connection device in the electric vehicle. Permanent or semi-permanent fixing waterproof structures are the glue dispensing type, the adhesive-backed type and the sealed enclosure type, etc., and the permanent or semi-permanent fixing waterproof structures are unable to be used for the battery connection device that requires a high frequent insertion and a high frequent withdrawal. When an O-ring rubber gasket is used in the high frequent insertion and the high frequent withdrawal of the battery connection device, the O-ring rubber gasket is apt to be deformed due to an elastic contraction force of the O-ring rubber gasket. In addition, the O-ring rubber gasket is formed in a circular shape, and the O-ring rubber gasket has curved surfaces, when the user inserts or withdraws the on-board battery, the user hardly determines whether the O-ring rubber gasket completely fits to a buckling slot of the battery connection device, the user hardly judges whether an angle between the O-ring rubber gasket and the battery connection device is correct, and the user hardly judges whether a pressing position between the O-ring rubber gasket and the battery connection device is correct, so that a poor sealing between the O-ring rubber gasket and the battery connection device is increased, and the on-board battery or the electric vehicle is damaged.

Therefore, it is particularly important to provide an innovative battery connection device which is easily inserted to or withdrawn from, and the battery connection device maintains a better waterproof performance under a high frequency insertion and a high frequency withdrawal.

SUMMARY OF THE INVENTION

An object of the present invention is to provide a battery connection device. The battery connection device includes a base end connector, a battery end connector and a waterproof rubber ring. The base end connector includes a base end terminal module. The base end terminal module is mounted to the base end connector, and the base end terminal module is exposed to an upper surface of the base end connector. The base end connector has a ring-shaped holding groove. The holding groove is recessed inward in the upper surface of the base end connector. The holding groove surrounds the base end terminal module. The battery end connector is cooperated with the base end connector, and the battery end connector is docked with the base end connector. The battery end connector includes a base plate, and a battery end terminal module mounted on the base plate. The battery end terminal module is exposed to a bottom surface of the base plate. The base end terminal module is docked with the battery end terminal module. The base end terminal module is electrically connected with the battery end terminal module. The waterproof rubber ring is mounted between the base end connector and the battery end connector. The waterproof rubber ring has a rubber ring body and a waterproof sealing ring. The waterproof sealing ring is integrally formed with the rubber ring body. The rubber ring body is fastened in the holding groove. The waterproof sealing ring protrudes beyond the upper surface of the base end connector. An inner side surface of the waterproof sealing ring that faces towards the base end terminal module is an inclined surface. The inclined surface and an upper surface of the rubber ring body form an obtuse angle. A top end of the waterproof sealing ring is a rounded corner.

Another object of the present invention is to provide a battery connection device. The battery connection device includes a base end connector, a battery end connector and a waterproof rubber ring. The base end connector includes a base end terminal module, and the base end terminal module is exposed to an upper surface of the base end connector. The base end connector has a ring-shaped holding groove. The holding groove is recessed inward in the upper surface of the base end connector. The holding groove surrounds the base end terminal module. The battery end connector is docked with the base end connector. The battery end connector includes a base plate, and a battery end terminal module mounted on the base plate. The battery end terminal module is exposed to a bottom surface of the base plate. The base end terminal module is docked with the battery end terminal module. The bottom surface of the base plate protrudes downward to form a rib. The rib is corresponding to the holding groove. The waterproof rubber ring is mounted between the base end connector and the battery end connector. The waterproof rubber ring has a rubber ring body and a waterproof sealing ring. The waterproof sealing ring is integrally formed with the rubber ring body. The rubber ring body is fastened in the holding groove. The rib abuts against the rubber ring body. The waterproof sealing ring protrudes beyond the upper surface of the base end connector. An inner side surface of the waterproof sealing ring that faces towards the base end terminal module is an inclined surface. The inclined surface and an upper surface of the rubber ring body form an obtuse angle. A top end of the waterproof sealing ring is a rounded corner.

Another object of the present invention is to provide a battery connection device. The battery connection device includes a base end connector, a battery end connector and a waterproof rubber ring. The base end connector includes a cover, and a base end terminal module mounted to the cover. A middle of the cover has a receiving space penetrating through the cover along an up-down direction. The base end terminal module is received in the receiving space. A top of the base end terminal module is exposed to an upper surface of the middle of the cover from the receiving space. The upper surface of the middle of the cover is recessed inward to form a holding groove. The holding groove surrounds the receiving space and the base end terminal module. The battery end connector is docked with the base end connector. The battery end connector includes a base plate, and a battery end terminal module mounted on the base plate. The battery end terminal module is exposed to a bottom surface of the base plate. The base end terminal module is docked with the battery end terminal module. The bottom surface of the base plate protrudes downward to form a rib. The rib is corresponding to the holding groove. The waterproof rubber ring is mounted between the base end connector and the battery end connector. The waterproof rubber ring has a rubber ring body and a waterproof sealing ring. The waterproof sealing ring is protruded outward from an outer periphery of the rubber ring body. The waterproof sealing ring is integrally formed with the rubber ring body. A middle of the waterproof rubber ring has an opening penetrating through the waterproof rubber ring along the up-down direction. The rubber ring body is fastened in the holding groove. The rib abuts against the rubber ring body. The waterproof sealing ring protrudes beyond an upper surface of the base end connector. An inner side surface of the waterproof sealing ring that faces towards the base end terminal module is an inclined surface. The inclined surface and an upper surface of the rubber ring body form an obtuse angle. A top end of the waterproof sealing ring is a rounded corner. The base end terminal module contacts with the battery end terminal module through the opening.

As described above, when the base end connector is combined with the battery end connector, the inclined surface of the waterproof sealing ring keeps abutting against the base plate, and the waterproof rubber ring surrounds the base end terminal module, the waterproof rubber ring is fastened on the upper surface of the base end connector, so moisture is prevented from entering the base end terminal module and the battery end terminal module from an interstice between a lower surface of the battery end connector and the upper surface of the base end connector. Furthermore, the rib abuts against the rubber ring body to further prevent the moisture from entering the battery end terminal module and the base end terminal module.

DETAILED DESCRIPTION OF THE PREFERRED EMBODIMENT

Figure 1:
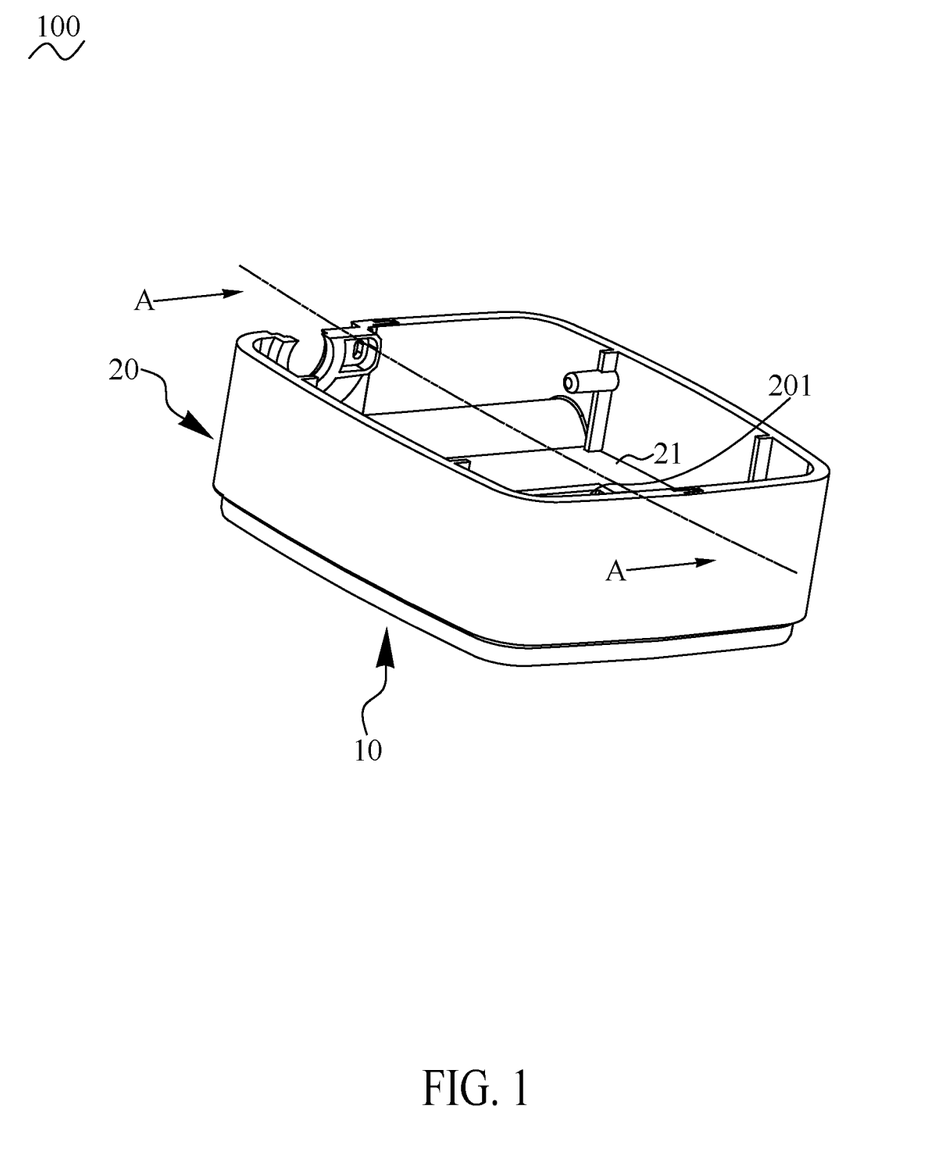
FIG. 1 is a perspective view of a battery connection device according to the present invention.
Figure 2:
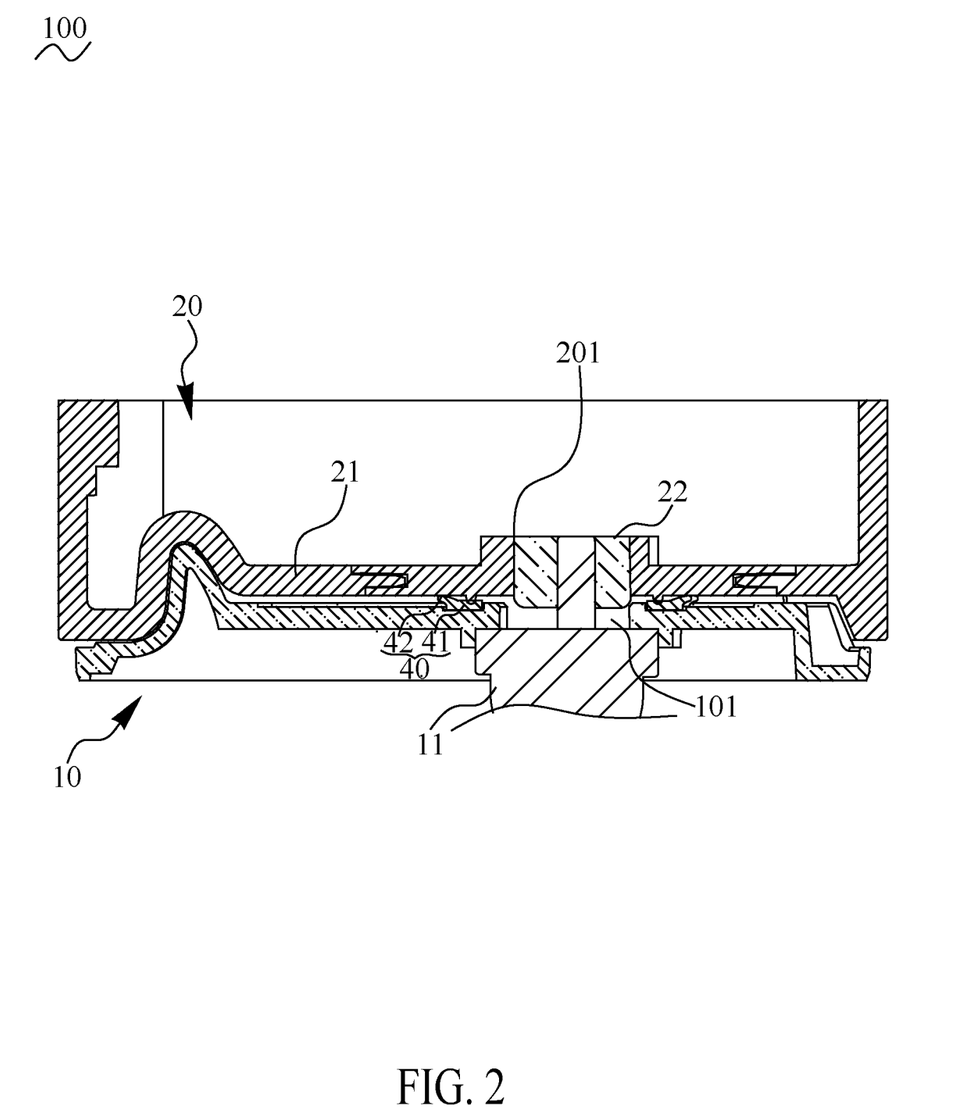
FIG. 2 is a sectional view of the battery connection device along a line A-A of FIG. 1.

Referring to FIG. 1 and FIG. 2, a battery connection device 100 in accordance with the present invention is shown. The battery connection device 100 includes a base end connector 10, a battery end connector 20 and a waterproof rubber ring 40. The battery end connector 20 is cooperated with the base end connector 10, and the battery end connector 20 is connected with the base end connector 10.

Figure 4:
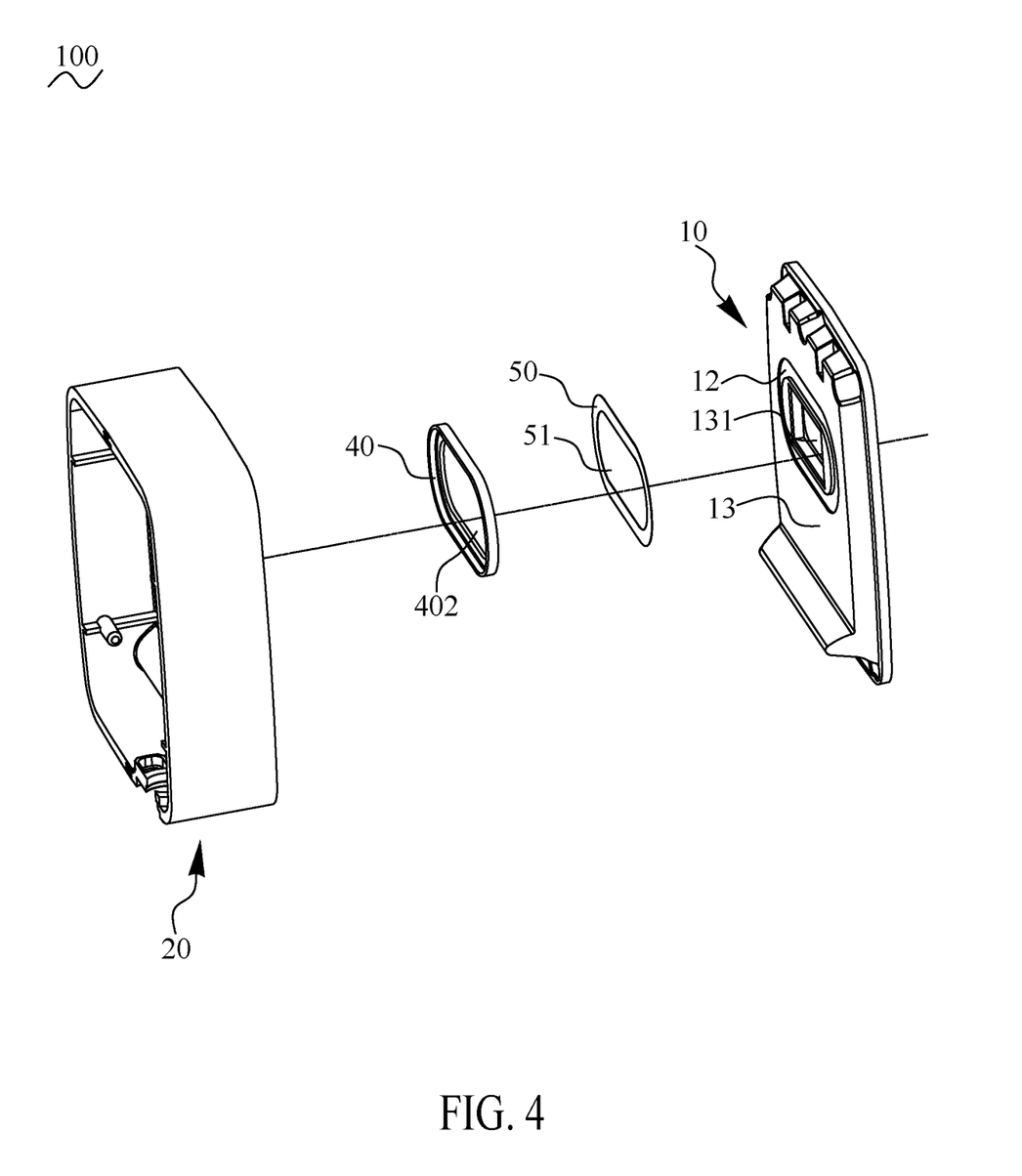
FIG. 4 is an exploded diagram of the battery connection device according to the present invention.
Figure 5:
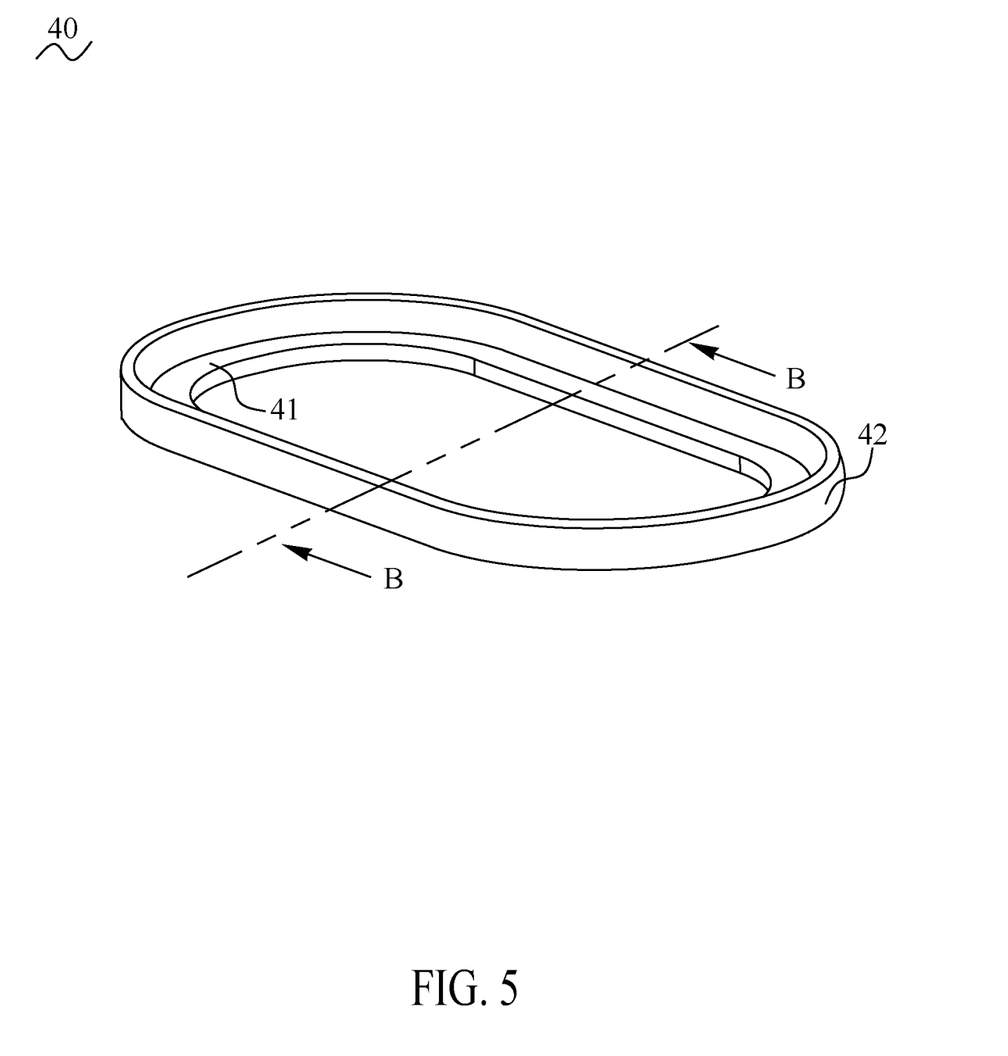
FIG. 5 is a perspective view of a waterproof rubber ring of the battery connection device according to the present invention.
Figure 6:
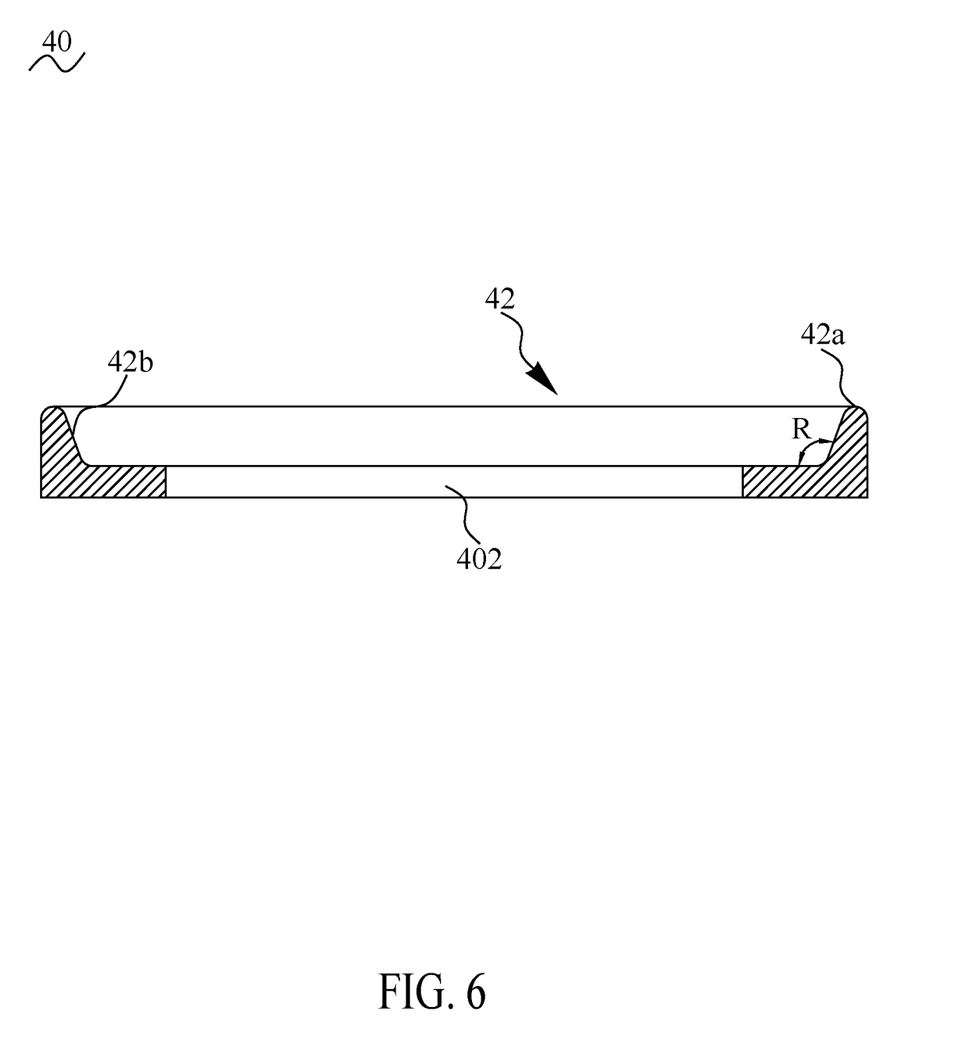
FIG. 6 is a sectional view of the waterproof rubber ring of the battery connection device along a line B-B of FIG. 5.

Referring to FIG. 1, FIG. 2 and FIG. 4, the battery end connector 20 is docked with the base end connector 10. The battery end connector 20 includes a base plate 21, and a battery end terminal module 22 mounted on the base plate 21. The battery end terminal module 22 is mounted in the battery end connector 20, and the battery end terminal module 22 is exposed to a bottom surface of the battery end connector 20. The battery end terminal module 22 is exposed to a bottom surface of the base plate 21. A front end of a middle of the base plate 21 has an accommodating groove 201 penetrating through the base plate 21 along an up-down direction. The battery end terminal module 22 is accommodated in the accommodating groove 201, and the battery end terminal module 22 is exposed to the bottom surface of the battery end connector 20 from the accommodating groove 201. The base end connector 10 includes a cover 13, and a base end terminal module 11 mounted to the cover 13. The base end terminal module 11 is mounted to the base end connector 10, and the base end terminal module 11 is exposed to an upper surface of the base end connector 10. The base end terminal module 11 is docked with the battery end terminal module 22 for making a power connection between the base end terminal module 11 and the battery end terminal module 22. The base end terminal module 11 is electrically connected with the battery end terminal module 22.

Referring to FIG. 2 and FIG. 4, the battery connection device 100 in accordance with a first preferred embodiment of the present invention is shown. In this first preferred embodiment, when the base end connector 10 is combined with the battery end connector 20, the battery end connector 20 is located above the base end connector 10, a lower surface of the battery end connector 20 faces towards the upper surface of the base end connector 10, and the lower surface of the battery end connector 20 is spaced from the upper surface of the base end connector 10 to form an interstice 101 between the lower surface of the battery end connector 20 and the upper surface of the base end connector 10. In order to prevent moisture entering the base end terminal module 11 and the battery end terminal module 22 from the interstice 101, the waterproof rubber ring 40 surrounds the base end terminal module 11. The waterproof rubber ring 40 is fastened on the upper surface of the base end connector 10.

Specifically, the base end connector 10 has a ring-shaped holding groove 12. The holding groove 12 is recessed inward in the upper surface of the base end connector 10. The holding groove 12 is disposed in the upper surface of the base end connector 10. A middle of the cover 13 has a receiving space 131 penetrating through the cover 13 along the up-down direction. An upper surface of the middle of the cover 13 is recessed inward to form the holding groove 12. The base end terminal module 11 is received in the receiving space 131. The holding groove 12 surrounds the receiving space 131 and the base end terminal module 11. A top of the base end terminal module 11 is exposed to the upper surface of the middle of the cover 13 from the receiving space 131. The waterproof rubber ring 40 is fastened in the holding groove 12 with a waterproof double sides adhesive tape 50. The holding groove 12 is formed in an oval shape, and the holding groove 12 surrounds a periphery of the base end terminal module 11. The holding groove 12 is without contacting the base end terminal module 11. The waterproof rubber ring 40 has a rubber ring body 41 and a waterproof sealing ring 42. The rubber ring body 41 is attached in the holding groove 12 with the waterproof double sides adhesive tape 50. The rubber ring body 41 is fastened in the holding groove 12.

Referring to FIG. 1 to FIG. 6, the waterproof rubber ring 40 is mounted between the base end connector 10 and the battery end connector 20. The waterproof sealing ring 42 is integrally formed with the rubber ring body 41. The waterproof sealing ring 42 is protruded outward from an outer periphery of the rubber ring body 41. The waterproof sealing ring 42 protrudes beyond the upper surface of the base end connector 10. The waterproof sealing ring 42 projects beyond an upper surface of the rubber ring body 41. A cross-section 401 of one side of the waterproof rubber ring 40 along a line A-A is a quasi-L shape structure seen from a side view. A middle of the waterproof rubber ring 40 has an opening 402 penetrating through the waterproof rubber ring 40 along the up-down direction. The opening 402 faces towards the base end terminal module 11. The waterproof rubber ring 40 and the waterproof double sides adhesive tape 50 are the oval shapes. A middle of the waterproof double sides adhesive tape 50 is hollow to form a locating space 51. The base end terminal module 11 contacts with the battery end terminal module 22 through the opening 402 and the locating space 51.

An inner side surface of the waterproof sealing ring 42 of the waterproof rubber ring 40 that faces towards the base end terminal module 11 is an inclined surface 42b. The inclined surface 42b is gradually inclined outward from a bottom of the inclined surface 42b to a top of the inclined surface 42b. The inclined surface 42b and the upper surface of the rubber ring body 41 form an obtuse angle (R). A top end of the waterproof sealing ring 42 is a rounded corner 42a. Therefore, when the battery end connector 20 is assembled to the upper surface of the base end connector 10, the waterproof sealing ring 42 is pressed towards the base end connector 10 by a bottom wall of the battery end connector 20, and the waterproof sealing ring 42 is deformed towards the outer periphery of the rubber ring body 41. A pressing force applied to the waterproof sealing ring 42 is increased, a degree of the obtuse angle (R) is increased, so that the top end of the waterproof sealing ring 42 keeps contacting with the base plate 21. When the base plate 21 presses against the waterproof sealing ring 42, the rounded corner 42a ensures that the waterproof sealing ring 42 is preferably deformed outward transitionally.

Then, the moisture is blocked outside a periphery of the waterproof rubber ring 40, so the moisture is prevented from entering the interstice 101 between the lower surface of the battery end connector 20 and the upper surface of the base end connector 10. The rounded corner 42a assists the waterproof sealing ring 42 to deform more gradually, and the degree of the obtuse angle (R) gradually becomes larger with the base plate 21 pressing against the waterproof sealing ring 42, so that the inclined surface 42b of the waterproof sealing ring 42 keeps abutting against the base plate 21. A design of the obtuse angle (R) decreases a stress concentration at the time of the waterproof sealing ring 42 deforming, so that the waterproof rubber ring 40 is less likely to crack. In the first preferred embodiment, a shore hardness of the waterproof rubber ring 40 is more than A30, and is less than A50. The shore hardness of the waterproof rubber ring 40 is directly proportional to a bearing pressure of the waterproof rubber ring 40. A cross-section of the waterproof sealing ring 42 along the line A-A is a substantially triangle shape seen from the side view. The shore hardness of the waterproof rubber ring 40 has less effect on a direction of the bearing pressure of the waterproof rubber ring 40 or an angle of the bearing pressure of the waterproof rubber ring 40. A hardness of the waterproof sealing ring 42 of the waterproof rubber ring 40 is adjusted according to a bearing pressure requirement of the waterproof rubber ring 40. When the bearing pressure of the waterproof rubber ring 40 exerted by the battery end connector 20 is smaller, the waterproof rubber ring 40 is made softer, otherwise, the waterproof rubber ring 40 is deformed difficultly on account of the waterproof rubber ring 40 being overly hard. The waterproof sealing ring 42 of the waterproof rubber ring 40 has a converse resisting effect as a converse resisting effect of a valve, so that the waterproof rubber ring 40 realizes a waterproof purpose.

Figure 3:
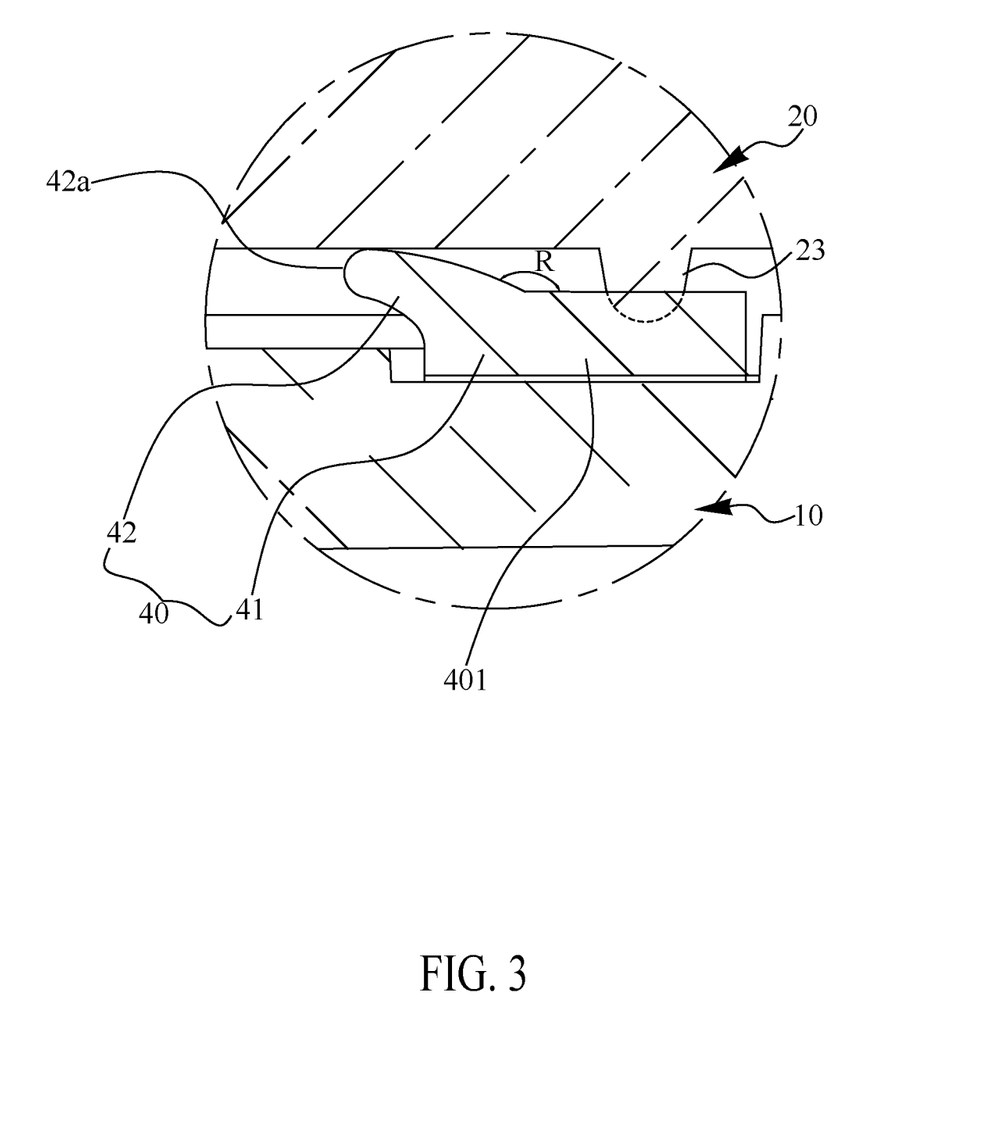
FIG. 3 is a partially enlarged diagram of the battery connection device of FIG. 2.

Referring to FIG. 2 and FIG. 3, the battery connection device 100 in accordance with a second preferred embodiment of the present invention is shown. In this second preferred embodiment, a bottom surface of the base plate 21 protrudes downward to form a rib 23. The rib 23 surrounds the accommodating groove 201 and the battery end terminal module 22. The rib 23 is formed in an elliptical shape, and the rib 23 is corresponding to the holding groove 12. When the battery end connector 20 is inserted to the upper surface of the base end connector 10, the rib 23 abuts against the rubber ring body 41 to further prevent the moisture from entering the battery end terminal module 22 and the base end terminal module 11.

As described above, when the base end connector 10 is combined with the battery end connector 20, the inclined surface 42b of the waterproof sealing ring 42 keeps abutting against the base plate 21, and the waterproof rubber ring 40 surrounds the base end terminal module 11, the waterproof rubber ring 40 is fastened on the upper surface of the base end connector 10, so the moisture is prevented from entering the base end terminal module 11 and the battery end terminal module 22 from the interstice 101. Furthermore, the rib 23 abuts against the rubber ring body 41 to further prevent the moisture from entering the battery end terminal module 22 and the base end terminal module 11.

What is claimed is:
1. A battery connection device, comprising:
   a base end connector including a base end terminal module, the base end terminal module being mounted to the base end connector, and the base end terminal module being exposed to an upper surface of the base end connector, the base end connector having a ring-shaped holding groove, the holding groove being recessed inward in the upper surface of the base end connector, the holding groove surrounding the base end terminal module;
   a battery end connector cooperated with the base end connector, and the battery end connector being docked with the base end connector, the battery end connector including a base plate, and a battery end terminal module mounted on the base plate, the battery end terminal module being exposed to a bottom surface of the base plate, the base end terminal module being docked with the battery end terminal module, the base end terminal module being electrically connected with the battery end terminal module; and a waterproof rubber ring mounted between the base end connector and the battery end connector, the waterproof rubber ring having a rubber ring body and a waterproof sealing ring, the waterproof sealing ring being integrally formed with the rubber ring body, the rubber ring body being fastened in the holding groove, the waterproof sealing ring protruding beyond the upper surface of the base end connector, an inner side surface of the waterproof sealing ring that faces towards the base end terminal module being an inclined surface, the inclined surface and an upper surface of the rubber ring body forming an obtuse angle, a top end of the waterproof sealing ring being a rounded corner.

2. The battery connection device as claimed in claim 1, wherein a shore hardness of the waterproof rubber ring is more than A30, and is less than A50.

3. The battery connection device as claimed in claim 1, wherein the waterproof sealing ring is protruded outward from an outer periphery of the rubber ring body, a cross-section of one side of the waterproof rubber ring is a quasi-L shape structure, a middle of the waterproof rubber ring has an opening penetrating through the waterproof rubber ring along an up-down direction, the opening faces towards the base end terminal module.

4. The battery connection device as claimed in claim 3, wherein the rubber ring body is attached in the holding groove with a waterproof double sides adhesive tape.

5. The battery connection device as claimed in claim 4, wherein a middle of the waterproof double sides adhesive tape is hollow to form a locating space, the base end terminal module contacts with the battery end terminal module through the opening and the locating space.

6. The battery connection device as claimed in claim 4, wherein the waterproof rubber ring and the waterproof double sides adhesive tape are oval shapes.

7. The battery connection device as claimed in claim 1, wherein the bottom surface of the base plate protrudes downward to form a rib, a front end of a middle of the base plate has an accommodating groove penetrating through the base plate along an up-down direction, the battery end terminal module is accommodated in the accommodating groove, and the battery end terminal module is exposed to a bottom surface of the battery end connector from the accommodating groove, the rib surrounds the accommodating groove and the battery end terminal module, the rib is corresponding to the holding groove, the rib abuts against the rubber ring body.

8. The battery connection device as claimed in claim 7, wherein the rib is formed in an elliptical shape.

9. The battery connection device as claimed in claim 1, wherein the holding groove is formed in an oval shape.

10. The battery connection device as claimed in claim 1, wherein the base end connector includes a cover, a middle of the cover has a receiving space penetrating through the cover along an up-down direction, the base end terminal module is received in the receiving space, an upper surface of the middle of the cover is recessed inward to form a holding groove, the holding groove surrounds the receiving space and the base end terminal module, a top of the base end terminal module is exposed to the upper surface of the middle of the cover from the receiving space.

11. The battery connection device as claimed in claim 1, wherein a cross-section of the waterproof sealing ring is a substantially triangle shape.

12. A battery connection device, comprising:

a base end connector including a base end terminal module, and the base end terminal module being exposed to an upper surface of the base end connector, the base end connector having a ring-shaped holding groove, the holding groove being recessed inward in the upper surface of the base end connector, the holding groove surrounding the base end terminal module;

a battery end connector docked with the base end connector, the battery end connector including a base plate, and a battery end terminal module mounted on the base plate, the battery end terminal module being exposed to a bottom surface of the base plate, the base end terminal module being docked with the battery end terminal module, the bottom surface of the base plate protruding downward to form a rib, the rib being corresponding to the holding groove; and a waterproof rubber ring mounted between the base end connector and the battery end connector, the waterproof rubber ring having a rubber ring body and a waterproof sealing ring, the waterproof sealing ring being integrally formed with the rubber ring body, the rubber ring body being fastened in the holding groove, the rib abutting against the rubber ring body, the waterproof sealing ring protruding beyond the upper surface of the base end connector, an inner side surface of the waterproof sealing ring that faces towards the base end terminal module being an inclined surface, the inclined surface and an upper surface of the rubber ring body forming an obtuse angle, a top end of the waterproof sealing ring being a rounded corner.

13. A battery connection device, comprising:

a base end connector including a cover, and a base end terminal module mounted to the cover, a middle of the cover having a receiving space penetrating through the cover along an up-down direction, the base end terminal module being received in the receiving space, a top of the base end terminal module being exposed to an upper surface of the middle of the cover from the receiving space, the upper surface of the middle of the cover being recessed inward to form a holding groove, the holding groove surrounding the receiving space and the base end terminal module;

a battery end connector docked with the base end connector, the battery end connector including a base plate, and a battery end terminal module mounted on the base plate, the battery end terminal module being exposed to a bottom surface of the base plate, the base end terminal module being docked with the battery end terminal module, the bottom surface of the base plate protruding downward to form a rib, the rib being corresponding to the holding groove; and a waterproof rubber ring mounted between the base end connector and the battery end connector, the waterproof rubber ring having a rubber ring body and a waterproof sealing ring, the waterproof sealing ring being protruded outward from an outer periphery of the rubber ring body, the waterproof sealing ring being integrally formed with the rubber ring body, a middle of the waterproof rubber ring having an opening penetrating through the waterproof rubber ring along the up-down direction, the rubber ring body being fastened in the holding groove, the rib abutting against the rubber ring body, the waterproof sealing ring protruding beyond an upper surface of the base end connector, an inner side surface of the waterproof sealing ring that faces towards the base end terminal module being an inclined surface, the inclined surface and an upper surface of the rubber ring body forming an obtuse angle, a top end of the waterproof sealing ring being a rounded corner;

wherein the base end terminal module contacts with the battery end terminal module through the opening.

\* \* \* \* \*